United States Patent

Kimoto et al.

[11] Patent Number: 6,034,742
[45] Date of Patent: Mar. 7, 2000

[54] ADAPTIVE SHARPNESS ENHANCEMENT FOR A MULTI-FREQUENCY SCANNING MONITOR

[75] Inventors: Masanobu Kimoto; Hiroyuki Nakazono, both of San Diego, Calif.

[73] Assignees: Sony Corporation, Tokyo, Japan; Sony Electronics, Inc., Park Ridge, N.J.

[21] Appl. No.: 08/957,881

[22] Filed: Oct. 27, 1997

[51] Int. Cl.[7] .................................................. H04N 5/21
[52] U.S. Cl. ........................... 348/625; 348/630; 348/807
[58] Field of Search .................................. 348/625, 630, 348/807; 382/266; H04N 5/21

[56] References Cited

U.S. PATENT DOCUMENTS 5,587,745  12/1996  Griepentrog ............................ 348/626

*Primary Examiner*—Sherrie Hsia
*Attorney, Agent, or Firm*—Blakely, Sokoloff, Taylor & Zafman LLP

[57] ABSTRACT

The present invention relates to a multi-frequency display system and method for providing sharpness enhancement. The system comprises a sharpness enhancement circuit that is configured to receive a first and a second input video signal, where the first input video signal operates at a first frequency, and the second input video signal operates at a second frequency. The system further comprises a controller circuit coupled to the sharpness enhancement circuit, that is configured to generate a first sharpness enhancement signal corresponding to the first frequency and a second sharpness enhancement signal corresponding to the second frequency. The sharpness enhancement circuit generates a first control signal in response to the first input video signal and the first enhancement signal, and the sharpness enhancement circuit generates a second control signal based on the second input video signal and the second enhancement signal. An electron gun coupled to the sharpness enhancement circuit is configured to provide an first image having a predetermined sharpness level at the first frequency based on the first control signal. The electron gun also provides a second image having the predetermined sharpness level at the second frequency based on the second control signal.

20 Claims, 7 Drawing Sheets

ADAPTIVE SHARPNESS ENHANCEMENT FOR A MULTI-FREQUENCY SCANNING MONITOR

BACKGROUND OF THE INVENTION

1. Field of the Invention

The present invention relates in general to monitors, and more particularly, to a method and apparatus for providing adaptive sharpness enhancement for a multi-frequency scanning monitor.

2. Description of the Related Art

Image quality depends on two major characteristics: contrast and sharpness. Contrast is the degree of difference between the light and dark regions. Sharpness is the degree of detail associated with the contours or edges of the image. While contrast tends to be a global feature, sharpness tends to be a local feature and is very much sensitive to how the pixels are displayed on the screen. Most commercial television sets provide adjustment of contrast and sharpness. The adjustment provides the user a means for varying the amount of contrast or sharpness according to his or her desire. Once the initial adjustment is made, no further adjustment is necessary. This is because television images are produced based on a fixed frequency as provided by the scanning circuitry. Adjustment of contrast and sharpness based on a fixed frequency system is thus simple.

Monitors that display digital images (e.g., graphics) typically use multi-frequency scanning to accommodate different image resolutions. The number of horizontal lines that can be displayed on the monitor screen is determined by how fast the horizontal scanning circuitry is driven. The higher the driving frequency, the higher the resolution. However, the change in scanning frequency usually causes degradation in image quality, and in particular, degradation in the sharpness of the image. When the system switches from one scanning frequency to another, the sharpness as set at one frequency does not produce the desirable sharpness quality at another frequency. The reason for this undesirable effect is that sharpness enhancement is typically performed at the edges or contours of the image, which is sensitive to scanning frequency.

In particular, sharpness enhancement involves accentuation at the edges or contours of the displayed image as shown in FIG. 1A. When the image goes from a light to a dark region, the edges are enhanced by increasing the image level at the edge and reducing the image level abruptly. This results in the display of an image with an effectively enhanced area EA1 (as shown in FIG. 2A) corresponding to the amount of abruptness, as indicated by the area A1 under the line a—a (as shown in FIG. 1A). Similarly, when the image goes from a dark to a light region, the edges are enhanced by decreasing the image level at the edge and increasing the image level abruptly. This results in the display of an image with an effectively enhanced area EA2 (as shown in FIG. 1B) corresponding to the amount of abruptness, as indicated by the area A2 above the line b—b (as shown in FIG. 1A). Thus, the amount of abruptness, as indicated by the area A1 or A2 under the line a—a or above the line b—b respectively, as shown in FIG. 1A, corresponds to the degree of sharpness. The effectively enhanced area EA1 or EA2 corresponding to the amount of abruptness is shown in FIG. 1B. The degree of abruptness is a function of three factors: (1) the difference L between the amplitude of the first and the second signal values (corresponding, for example, to the increased and decreased image levels), (2) the time interval T for the change from the first to the second signal values (or vice versa), and (3) the width of the signal (which, in FIG. 1A, is represented by $T_H$).

In conventional systems, when a sharpness level is set at a particular frequency, the amplitude difference L as well as the time interval of enhancement T are both fixed. Accordingly, the enhanced area B1 or B2 corresponding to an input signal of a lower frequency (such as that shown in FIG. 2A), is substantially identical to the enhanced area A1 or A2 corresponding to an input signal of a higher frequency (such as that shown in FIG. 1A). However, since the interval (or width) $T_W$ of the input signal is an inverse function of frequency, the effective area EB1 or EB2 of the displayed image (corresponding to the input frequency with the lower frequency) is reduced (see FIG. 2B).

Accordingly, there is a need in the technology for a method and apparatus for providing adaptive sharpness enhancement for multi-frequency systems such as a multi-frequency scan monitor so that consistently and well enhanced images may be provided.

BRIEF SUMMARY OF THE INVENTION

The present invention relates to a multi-frequency display system and method for providing sharpness enhancement. The system comprises a sharpness enhancement circuit that is configured to receive a first and a second input video signal, where the first input video signal operates at a first frequency, and the second input video signal operates at a second frequency. The system further comprises a controller circuit coupled to the sharpness enhancement circuit, that is configured to generate a first sharpness enhancement signal corresponding to the first frequency and a second sharpness enhancement signal corresponding to the second frequency. The sharpness enhancement circuit generates a first control signal in response to the first input video signal and the first enhancement signal, and the sharpness enhancement circuit generates a second control signal based on the second input video signal and the second enhancement signal. An electron gun coupled to the sharpness enhancement circuit is configured to provide an first image having a predetermined sharpness level at the first frequency based on the first control signal. The electron gun also provides a second image having the predetermined sharpness level at the second frequency based on the second control signal.

DETAILED DESCRIPTION OF THE INVENTION

The present invention is an apparatus and method for providing adaptive sharpness enhancement for multi-frequency systems such as a multi-frequency scan monitor.

Figure 1A:
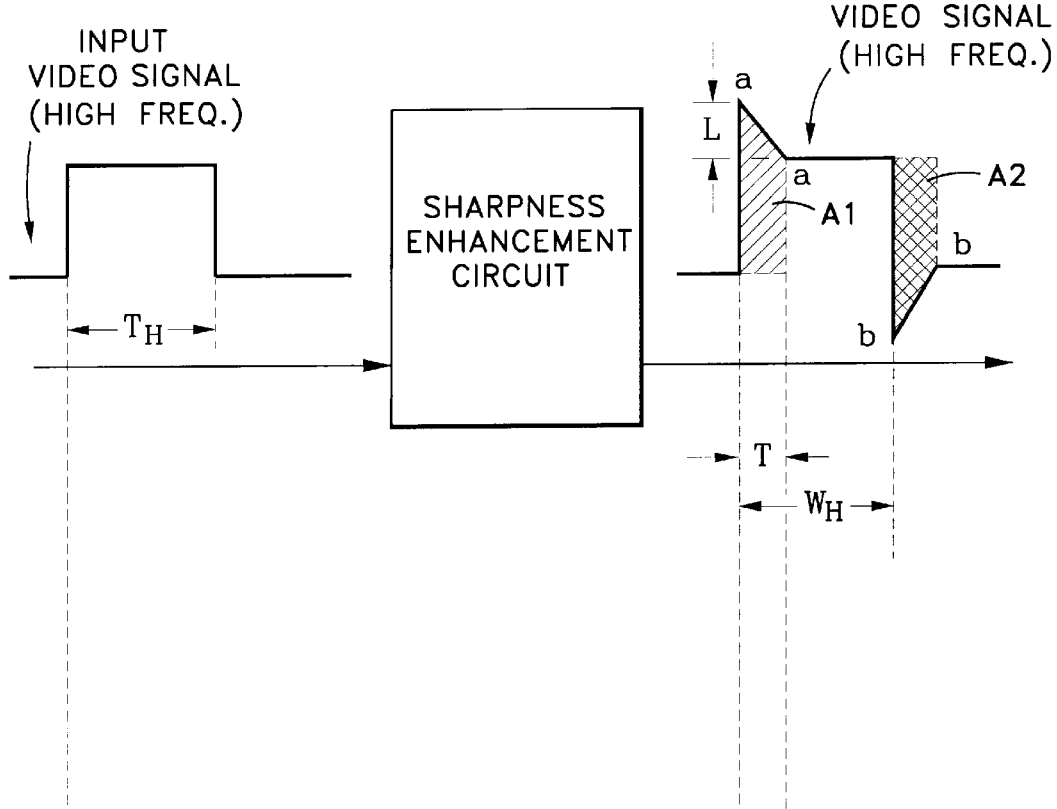
FIG. 1A illustrates an input signal with a high frequency and the corresponding enhanced output signal as provided by display systems of the prior art.
Figure 2A:
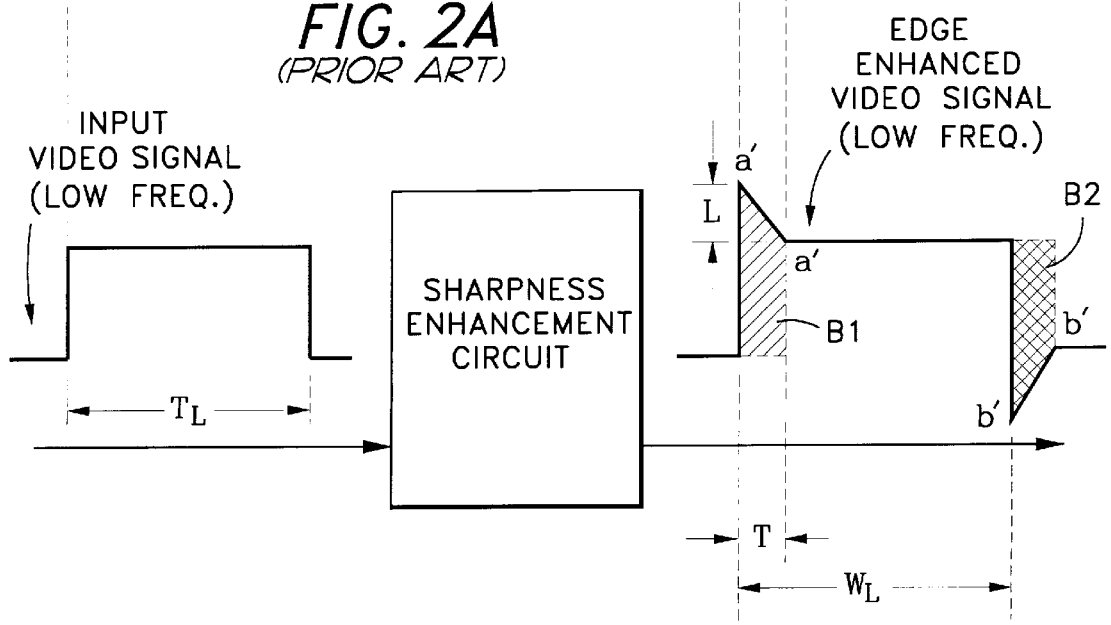
FIG. 2A illustrates an input signal with a low frequency and the corresponding enhanced output signal as provided by display systems of the prior art.
Figure 1B:
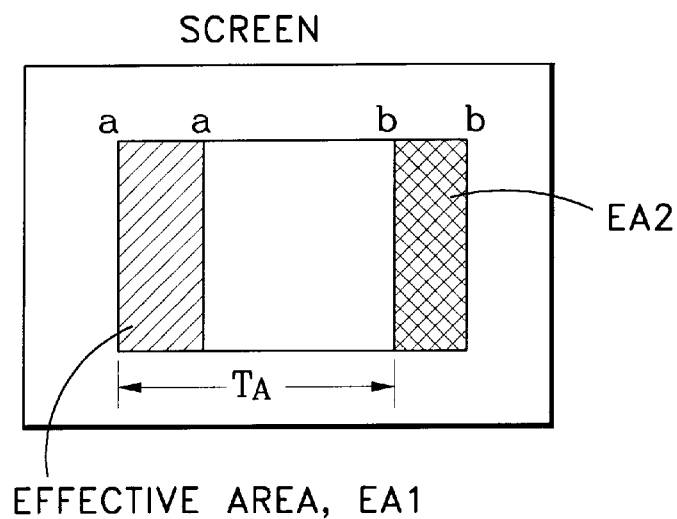
FIG. 1B illustrates the displayed image corresponding to the enhanced output signal of FIG. 1A.
Figure 2B:
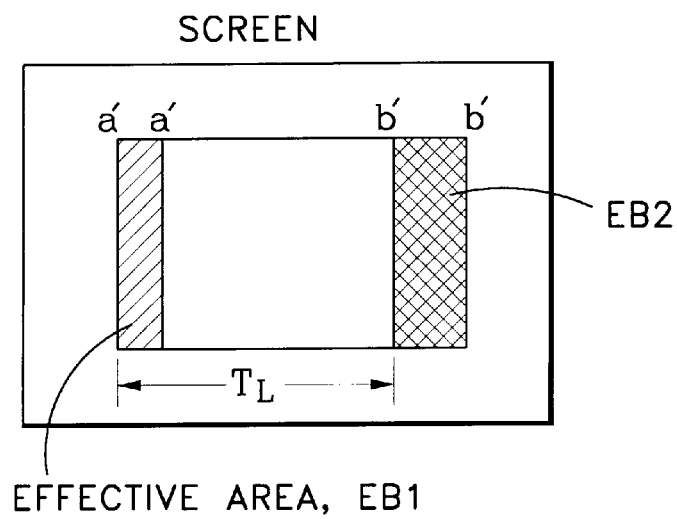
FIG. 2B illustrates the displayed image corresponding to the enhanced output signal of FIG. 2A.
Figure 3:
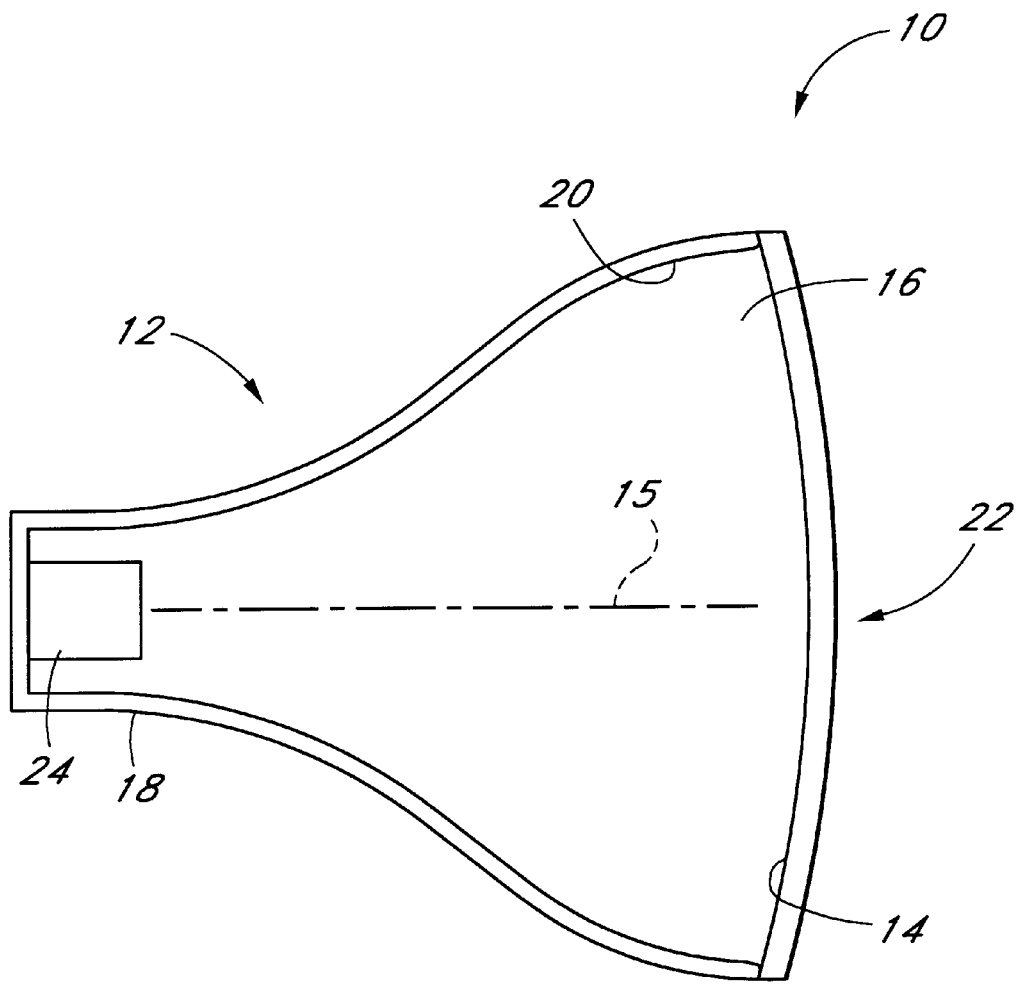
FIG. 3 is a cross sectional view of a conventional cathode ray tube.

As shown in FIG. 3, the CRT 10 consists of an electron gun 12 and a phosphor screen 14 that is located inside an evacuated glass envelope 16. The narrow neck 18 of the CRT 10 contains the electron gun unit 24, which generates a beam of electrons 15. The beam is accelerated towards the screen 14 by a positive anode voltage. The anode 20 is a conductive coating on the inside surface of the wide glass bell portion of the CRT 10. To form the screen, the inside of the faceplate 22 is coated with a luminescent material that produces light when excited by electrons in the beam 15. A monochrome picture tube has one electron gun and a continuous phosphor coating that produces a picture in black and white. For color picture tubes, the screen 14 is formed with dot trios or vertical lines of red, green and blue phosphors. In such color picture tubes, there are three electron beams, one for each color phosphor. Each of the three electron beams is emitted by a separate cathode.

Figure 4:
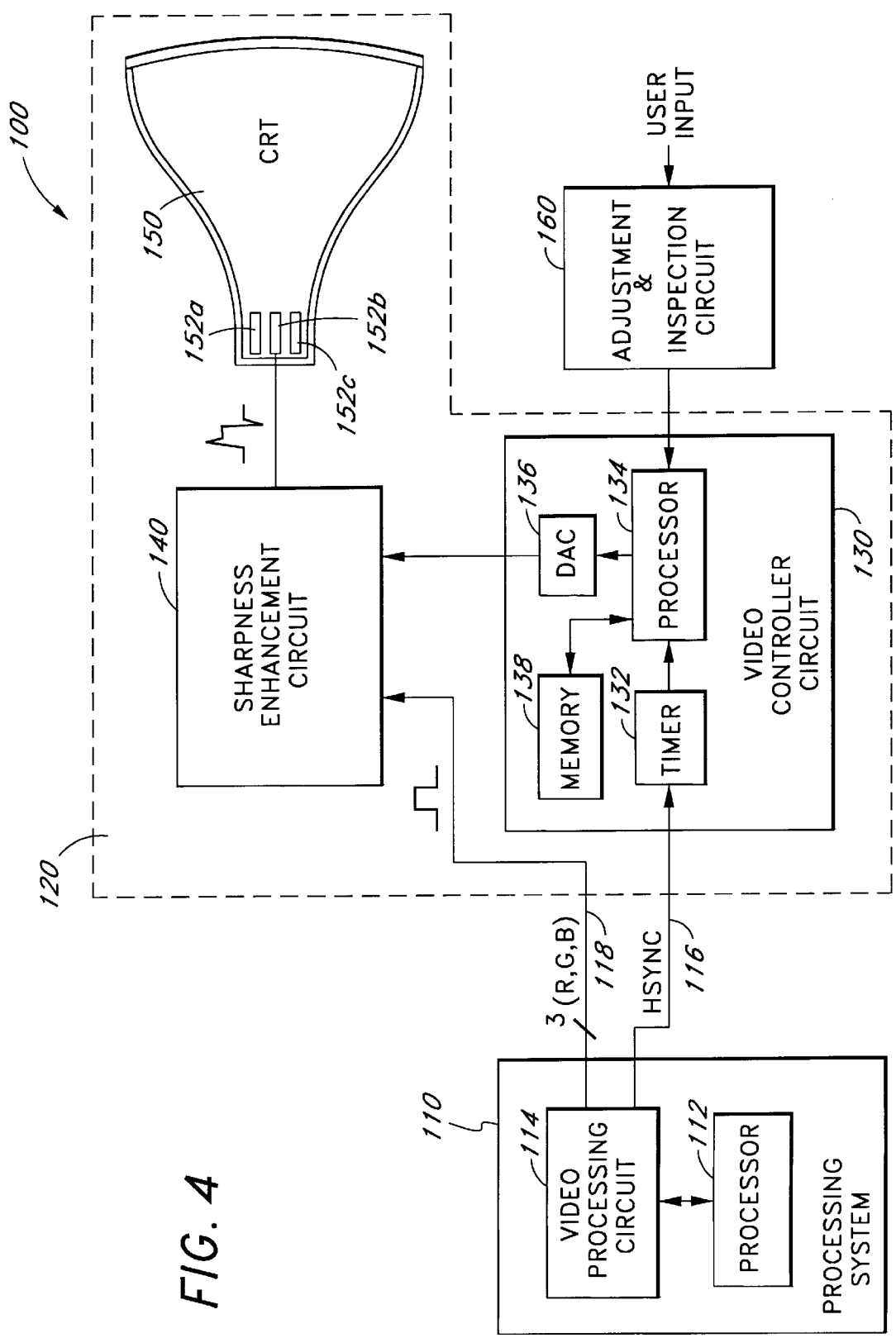
FIG. 4 illustrates one embodiment of the multi-frequency sharpness enhancement display system which implements the principles of the present invention.

FIG. 4 illustrates an electronic system 100 that provides calibration of the multi-frequency sharpness enhancement display system 120 in accordance with the principles of the present invention. The electronic system 100 comprises a processing system 110 and a multi-frequency sharpness enhancement display system 120 and an adjustment and inspection circuit 160. Tne display system 120 comprises a video controller circuit 130 that includes a timer 132, a processor 134, a memory 138 and a digital-to-analog converter (DAC) 136, a sharpness enhancement circuit 140 and a CRT 150 that includes a red electron gun 152a, a green electron gun 152b and a blue electron gun 152c. In one embodiment, the processing system 110 is a computer. However, it is contemplated that the processing system 110 may be any processor-based system. In one embodiment, the CRT 150 is substantially similar to the CRT 10 (FIG. 3).

The processing system 110 is coupled to the video controller circuit 130 via signal line 116. The signal line 116 provides clocking signals from the video processing circuit 114 to the timer 132. In one embodiment, the signal line 116 provides horizontal synchronization signals HSYNC from the video processing circuit 114 to the timer 132. The timer 132 provides timing signals for the processor 134, DAC 136 and memory 138, as well as other circuits in the video controller circuit 130.

The processing system 110 is also coupled to the sharpness enhancement circuit 140 via signal line 118 and provides input video signals such red, green, and blue input signal information to the sharpness enhancement circuit 140 via signal line 118. The controller circuit 130 is also coupled to the sharpness enhancement circuit 140, and provides a sharpness enhancement signal having sharpness enhancement information to the sharpness enhancement circuit 140.

Based on the input signals and the sharpness enhancement signal, the sharpness enhancement circuit 140 generates a control signal which is provided to each electron gun 152a, 152b and 152c, so that enhancement of input video signal may be facilitated. In one embodiment, the sharpness enhancement circuit 140 is that marketed by Sony Corp. under the part designation CXA2093S/M. In one embodiment, the controller circuit 130 is the controller as marketed by SGS-Thomson under the part designation ST7275.

The processor system comprises a processor 112 and a video processing circuit 114. The processor 112 generates input video signals that are provided to the sharpness enhancement circuit 140 via the video processing circuit 114. The processor 112 also generates clocking signals that are provided to the timer 132 in the controller circuit 130. In one embodiment, the processor 112 is a Pentium™ or a Pentium Pro™ processor. The timer 132 subsequently generates timing signals for driving the circuitry within the controller circuit 130. The processor 134 within the controller circuit 130 generates a control signal that is subsequently converted by the DAC 136 to provide enhancement control for the input video signals provided via signal line 118. In particular, the control signals include values for operating each electron gun 152a, 152b, and/or 152c at predetermined enhancement levels, as described in detail in the following sections.

To calibrate the display system 120, the user operates the calibration system 100 at a first predetermined frequency by configuring the processing system 110 to generate input video signals at a first predetermined frequency. The sharpness of the image generated on the screen of the CRT 150 is determined. This can be achieved by an objective method employing an automatic image analysis or a subjective method in which a well-trained user visually inspects the image sharpness. When the desired amount of sharpness is obtained, the enhancement level is recorded by the adjustment and inspection circuit 160, which subsequently provides values corresponding to the detected frequency and enhancement level to the processor 134 in the controller circuit 130. The video controller circuit 130 stores the detected sharpness enhancement value and the corresponding input frequency in memory 138.

Figure 5:
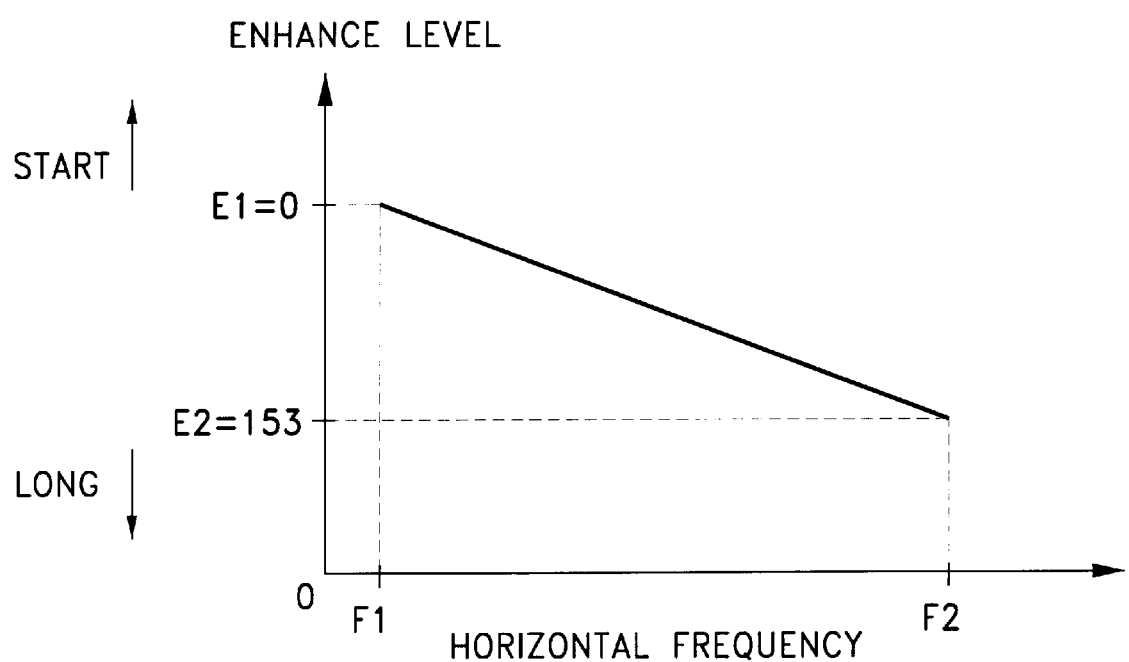
FIG. 5 illustrates one embodiment of a graph of enhanced levels versus input frequencies, used in implementing the principles of the present invention.

A second set of data points, i.e., a sharpness enhancement value for input signals at a second input frequency, may likewise be obtained. As shown in FIG. 5, upon obtaining the two sets of data points (for example, a first enhancement value E1 and its corresponding first input signal frequency F1 and a second enhancement value E2 and its corresponding second input signal frequency F2), the processor 134 may interpolate the two sets of data (E1, F1) and (E2, F2) to obtain a range of sharpness enhancement levels and the corresponding range of input signal frequencies, so that the resulting displayed image will have substantially identical sharpness enhancement for any input signal provided within the range of input signal frequencies described above.

FIG. 5 illustrates one embodiment of such a plot. In one embodiment, using an 8-bit register (with a maximum level of 256), E1 is 0 with a corresponding input frequency F1 of 30 KHz, while E2 is 153 with a corresponding input frequency F2 of 85 KHz. In one embodiment, the process for detecting the outputs of the electron guns 152a, 152b and 152c may be performed using the Adjustment/Inspection Standard TS-6999-919M-10.

Figure 6A:
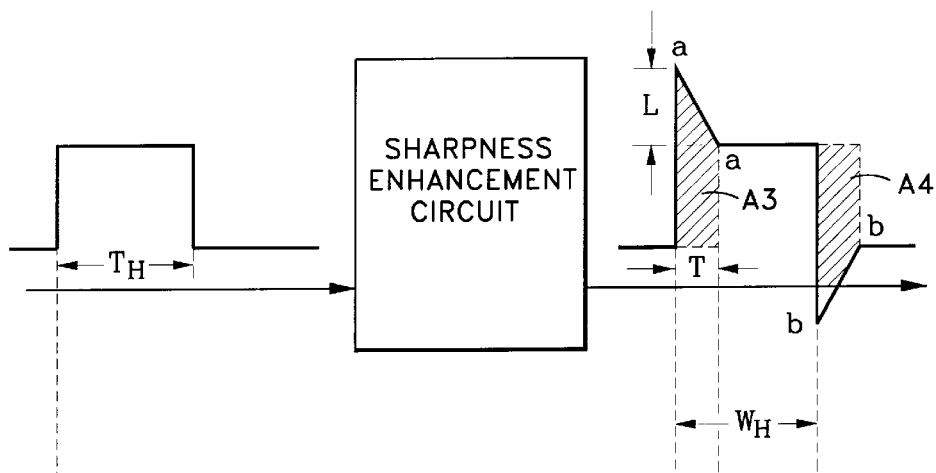
FIG. 6A illustrates an input signal with a high frequency and the corresponding enhanced output signal as provided by the display system provided in accordance with the principles of the present invention.
Figure 6B:
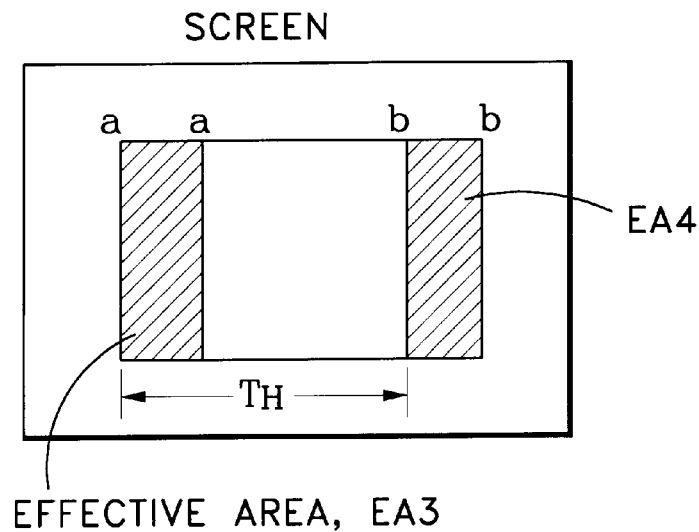
FIG. 6B illustrates the displayed image corresponding to the enhanced output signal of FIG. 6A.

FIG. 6A illustrates an input signal with a low frequency and the corresponding enhanced output signal as provided by the display system 120 provided in accordance with the principles of the present invention. FIG. 6B illustrates the displayed image corresponding to the enhanced output signal of FIG. 6A.

Figure 7A:
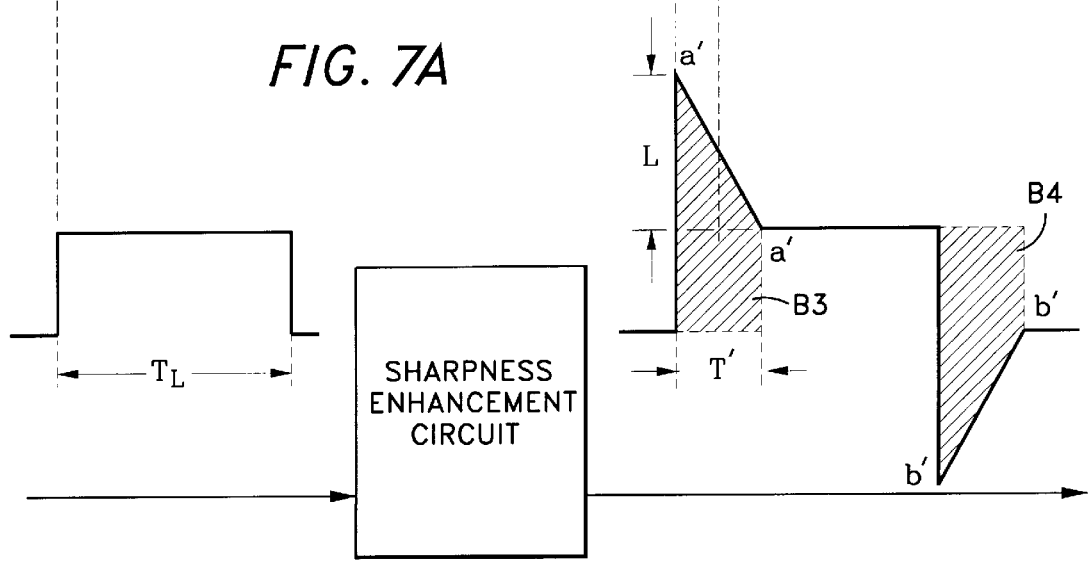
FIG. 7A illustrates an input signal with a low frequency and the corresponding enhanced output signal as provided by the display system provided in accordance with the principles of the present invention.
Figure 7B:
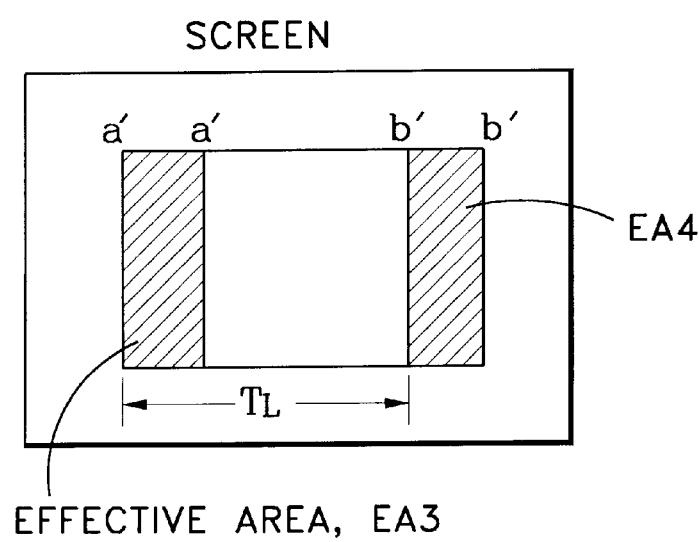
FIG. 7B illustrates the displayed image corresponding to the enhanced output signal of FIG. 7A.

FIG. 7A illustrates an input signal with a low frequency and the corresponding enhanced output signal as provided by the display system provided in accordance with the principles of the present invention. FIG. 7B illustrates the displayed image corresponding to the enhanced output signal of FIG. 7A.

When the image goes from a light to a dark region, the edges are enhanced by the sharpness enhancement circuit 140 by increasing the image level at the edge and reducing the image level abruptly. This results in the display of an image with an effectively enhanced area EA3 (as shown in FIG. 6B) corresponding to the amount of abruptness, as indicated by the area A under the line a—a (as shown in FIG. 6A). Similarly, when the image goes from a dark to a light region, the edges are enhanced by decreasing the image level at the edge and increasing the image level abruptly. This results in the display of an image with an effectively enhanced area EA4 (as shown in FIG. 6B) corresponding to the amount of abruptness, as indicated by the area B above the line b—b (as shown in FIG. 6A). Thus, the amount of abruptness, as indicated by the area A3 or A4 under the line a—a or above the line b—b respectively, as shown in FIG. 6A, corresponds to the degree of sharpness. The respective effectively enhanced area EA3 or EA4, corresponding to the amount of abruptness, is shown in FIG. 6B.

By implementing the present invention, an enhanced signal having a sharpness level for a particular frequency (for example, a high frequency, as shown in FIG. 6A) has an amplitude difference L and a time interval of enhancement T (which is inversely proportional to the frequency of the input signal). When an input signal of a different frequency (for example, a low frequency, as shown in FIG. 7A) is encountered, the present invention adjusts the sharpness enhancement signal provided from the controller circuit 130 to the sharpness enhancement circuit 140 in accordance with the previously stored data (such as the plot shown in FIG. 5). As a result, the sharpness of the resulting image is substantially identical to that of an input signal at another frequency.

In particular, an enhanced signal having an amplitude difference L and a time interval of enhancement T' (which is inversely proportional to the frequency of the input signal and larger than T) is provided as shown in FIG. 7A. Accordingly, the enhanced area B3 or B4 corresponding to an input signal of a lower frequency (see FIG. 7A), is larger than the enhanced area A3 or A4 corresponding to an input signal of a higher frequency (see FIG. 6A). As a result, the effective enhanced area EA3 or EA4 of the displayed image is substantially identical in both cases (see FIGS. 6B and 7B).

In this manner, the outputs of the electron guns 152a, 152b or 152c may be configured to provide display images with sharpness enhancement that is substantially identical for any input signal frequency. As a result, consistently and well enhanced images may be displayed. The present invention thus provides a method and apparatus for providing adaptive sharpness enhancement for multi-frequency systems such as a multi-frequency scan monitor.

The present invention may be embodied in other specific forms without departing from its spirit or essential characteristics.

The described embodiments are to be considered in all respects without only as illustrative and not restrictive. The scope of the invention is, therefore, indicated by the appended claims rather than the foregoing description. All changes which come within the meaning and range of equivalency of the claims are to be embraced within their scope.

What is claimed is:

1. A multi-frequency display system for providing sharpness enhancement, comprising:

a sharpness enhancement circuit that is configured to receive a first and a second input video signal, said first input video signal operating at a first frequency, said second input video signal operating at a second frequency;

a controller circuit coupled to the sharpness enhancement circuit, that is configured to generate a first sharpness enhancement signal corresponding to the first frequency and a second sharpness enhancement signal corresponding to the second frequency, said sharpness enhancement circuit generating a first control signal in response to said first input video signal and said first enhancement signal, said sharpness enhancement circuit generating a second control signal based on said second input video signal and said second enhancement signal; and an electron gun coupled to the sharpness enhancement circuit, said electron gun being configured to provide a first image having a sharpness level at the first frequency based on said first control signal, and to provide a second image having the sharpness level at the second frequency based on the second control signal.

2. The system of claim 1, further comprising a processing system coupled to said controller circuit, said processing system having a processor that is configured to provide said first and said second input video signals.

3. The system of claim 2, wherein said processing system further provides timing signals to said controller circuit.

4. The system of claim 2, wherein the processing system further comprises a video processing circuit coupled to said processor, said video processing circuit being configured to provide said first and said second video input signals.

5. The system of claim 1, wherein said controller circuit comprises a processor and a memory coupled, said processor storing a first value and a second value corresponding to said first and said second sharpness enhancement signals respectively.

6. The system of claim 1, wherein the electron gun comprises a set of electron guns.

7. The system of claim 6, wherein the set of electron guns comprises a red, a blue and a green electron gun.

8. The system of claim 6, wherein said first and said second video input signals each comprises a red input signal, a green input signal and a blue input signal.

9. The system of claim 1, further comprising an adjustment circuit coupled to said controller circuit, said adjustment circuit being configured to receive input signals corresponding to the first and said second sharpness enhancement signals.

10. The system of claim 9, wherein said controller circuit comprises a processor and a memory coupled to said processor, said processor storing a first value and a second value corresponding to said first and said second sharpness enhancement signals respectively.

11. A method for providing color convergence in a multi-frequency display system, comprising;

receiving a first video input signal that operates at a first frequency;

generating a first sharpness enhancement signal corresponding to the first frequency;

generating a first control signal in response to said first input video signal and said first enhancement signal;

configuring an electron gun to provide a first image having a sharpness level at the first frequency based on said first control signal;

receiving a second video input signal that operates at a second frequency;

generating a second sharpness enhancement signal corresponding to the second frequency;

generating a second control signal in response to said second input video signal and said second enhancement signal;

configuring the electron gun to provide a second image having the sharpness level at the second frequency based on said second control signal.

12. The method of claim 11, further comprising providing a processing system having a processor that is configured to provide said first and said second video input signals.

13. The method of claim 12, further comprising configuring said processing system to provide timing signals.

14. The method of claim 12, wherein in the providing a processing system, the processing system further comprises a video processing circuit coupled to said processor, said video processing circuit being configured to provide said first and said second video input signals.

15. The method of claim 11, further comprising storing a first value and a second value corresponding to said first and said second sharpness enhancement signals respectively.

16. The method of claim 11, wherein in the configuring the electron gun, the electron gun comprises a set of electron guns.

17. The method of claim 16, wherein in the configuring the electron gun, the set of electron guns comprises a red, a blue and a green electron gun.

18. The method of claim 16, wherein receiving the first video input signal comprises receiving a red input signal, a green input signal and a blue input signal; and wherein the receiving the second video input signal comprises receiving a red input signal, a green input signal and a blue input signal.

19. The method of claim 11, further comprising providing an adjustment circuit that is configured to receive input signals corresponding to the first and said second sharpness enhancement signals.

20. The method of claim 19, further comprising storing a first value and a second value corresponding to said first and said second sharpness enhancement signals respectively.

* * * * *

UNITED STATES PATENT AND TRADEMARK OFFICE
CERTIFICATE OF CORRECTION

PATENT NO. : 6,034,742
DATED : March 7, 2000
INVENTOR(S) : Kimoto et al.

It is certified that error appears in the above-identified patent and that said Letters Patent is hereby corrected as shown below:

In column 3 at line 40 delete "Tne" and insert --The--

In column 5 at line 67 delete "without"

Signed and Sealed this

Third Day of April, 2001

Attest:

NICHOLAS P. GODICI

Attesting Officer     Acting Director of the United States Patent and Trademark Office